United States Patent
Wu

(10) Patent No.: US 10,036,482 B1
(45) Date of Patent: Jul. 31, 2018

(54) ACTUATOR WITH SAFETY MECHANISM

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/708,067

(22) Filed: Sep. 18, 2017

(30) Foreign Application Priority Data

Aug. 15, 2017 (TW) .............................. 106212050 U

(51) Int. Cl.
*F16H 3/06* (2006.01)
*F16K 31/04* (2006.01)

(52) U.S. Cl.
CPC .................................. *F16K 31/043* (2013.01)

(58) Field of Classification Search
CPC ......... F16H 25/20; F16H 25/24; H02K 7/116; F16K 31/043
See application file for complete search history.

(56) References Cited

U.S. PATENT DOCUMENTS

| | | | | |
|---|---|---|---|---|
| 7,533,591 B2* | 5/2009 | Wang | ................... | F16H 25/20 5/616 |
| 7,866,225 B2* | 1/2011 | Oberle | ................... | B60N 2/067 74/427 |
| 7,926,371 B2* | 4/2011 | Nielsen | ................ | A47C 20/041 5/616 |
| 8,024,987 B2* | 9/2011 | Yamaguchi | ............. | F16H 1/225 74/89.23 |
| 8,146,991 B2* | 4/2012 | Stanz | ................... | B60N 2/0232 297/344.13 |
| 8,186,236 B2* | 5/2012 | Lorenzen | ................ | B66C 23/48 188/67 |
| 8,210,064 B2* | 7/2012 | Ku | ........................... | B66F 3/08 74/89.38 |
| 8,281,677 B2* | 10/2012 | Duck | ................. | B65D 73/0085 74/89.23 |
| 8,314,525 B2* | 11/2012 | Kragh | ................... | H02K 5/136 310/83 |
| 8,402,854 B2* | 3/2013 | Yamaguchi | ............ | A61G 7/018 74/89.23 |
| 8,495,924 B2* | 7/2013 | Fukano | ............... | F16H 25/2454 254/98 |
| 8,534,147 B2* | 9/2013 | Roither | ................ | A47C 20/041 74/89.33 |
| 9,074,659 B2* | 7/2015 | Wu | ........................ | F16D 11/10 |
| 9,163,685 B2* | 10/2015 | Carmassi | ............. | F16D 65/853 |
| 9,222,556 B2* | 12/2015 | Schlecht | ................. | F16H 25/20 |
| 9,252,692 B2* | 2/2016 | Hille | ....................... | H02P 29/00 |

(Continued)

*Primary Examiner* — Zakaria Elahmadi
(74) *Attorney, Agent, or Firm* — Chun-Ming Shih; HDLS IPR Services

(57) ABSTRACT

An actuator with a safety mechanism includes a gear box (10), a motor (20), a driven gear (30), a transmission (40), a retractable tube (50) and a push switch (60). The transmission (40) has a guiding threaded rod (41) and a touch element (42). When the retractable tube (50) is limited during moving, the transmission (40) will linearly move toward a direction of the retractable tube (50) and the motor (20) is stopped operating by touching the push switch (60) with the touch element (42). Thereby, an anti-pinch effect and increase of safety of using products can be accomplished.

15 Claims, 9 Drawing Sheets

(56) References Cited

U.S. PATENT DOCUMENTS

| | | | |
|---|---|---|---|
| 9,303,740 B2 * | 4/2016 | Wu | F16H 25/20 |
| 9,353,836 B2 * | 5/2016 | Anheier | F16H 25/20 |
| 9,453,563 B2 * | 9/2016 | Alfano | F16H 25/20 |
| 9,642,758 B2 * | 5/2017 | Koch | A47B 9/04 |
| 9,669,535 B2 * | 6/2017 | Yaschur | B25F 5/02 |
| 9,796,073 B2 * | 10/2017 | Yaschur | B25F 5/02 |

* cited by examiner

US 10,036,482 B1

ACTUATOR WITH SAFETY MECHANISM

BACKGROUND OF THE INVENTION

1. Technical Field

The invention relates to actuators, particularly to an actuator with a safety mechanism.

2. Related Art

An actuator primarily uses a motor, a worm and a worm gear to drive a guiding threaded rod to rotate. And the guiding threaded rod drives a retractable tube connected thereto to make a stretching or retracting act. Because such an actuator is simpler and more convenient than a hydraulic cylinder or pneumatic cylinder in structure and installation, it has been widely applied in sickbeds and electric chairs, doors and windows, or other circumstances requiring reciprocation.

Most existing actuators are arranged with a front limit switch and a rear limit switch in a moving path of a nut of the retractable tube for being touched by the nut during the moving of the nut by the guiding threaded rod. As a result, the retractable tube can be effectively controlled to stretch or retract.

However, when the existing actuator is applied in electric chairs or windows, because the motor can be stopped only while the nut is touching one of the two limit switches which are located at two opposite ends of the retractable tube, if a user or child accidentally puts his or her hand in the machine while the nut is moving to a middle position of the travel, there is no safety mechanism which can stop the motor. As a result, pinching injuries will occur. This problem should be overcome.

SUMMARY OF THE INVENTION

An object of the invention is to provide an actuator with a safety mechanism, which can accomplish an anti-pinch effect by means of movability of the transmission to increase safety of the product in use.

To accomplish the above object, the actuator with a safety mechanism of the invention includes a gear box, a motor, a driven gear, a transmission, a retractable tube and a push switch. The motor is connected to the gear box. The driven gear is received in the gear box and driven by the motor. The transmission is partly received in the gear box and partly projects over the gear box. The transmission has a guiding threaded rod and a touch element mounted around the guiding threaded rod. An end of the guiding threaded rod penetratingly connects the driven gear and is movably supported in the gear box with the touch element. The retractable tube is arranged at a side of the gear box and threadedly connects the guiding threaded rod to be driven. The push switch is electrically connected to the motor and is arranged in a moving path of the touch element. When the retractable tube is limited during moving, the transmission will linearly move toward a direction of the retractable tube and the motor is stopped operating by touching the push switch with the touch element.

The invention also has the following advantages. By an arrangement of an elastic element, the bearing and the guiding threaded rod can be restored to their original positions. When the actuator of the invention is applied in an electric window, the window can be closed more tightly by the pressing block pressing the touch switch and stopping the motor.

DETAILED DESCRIPTION OF THE INVENTION

Figure 1:
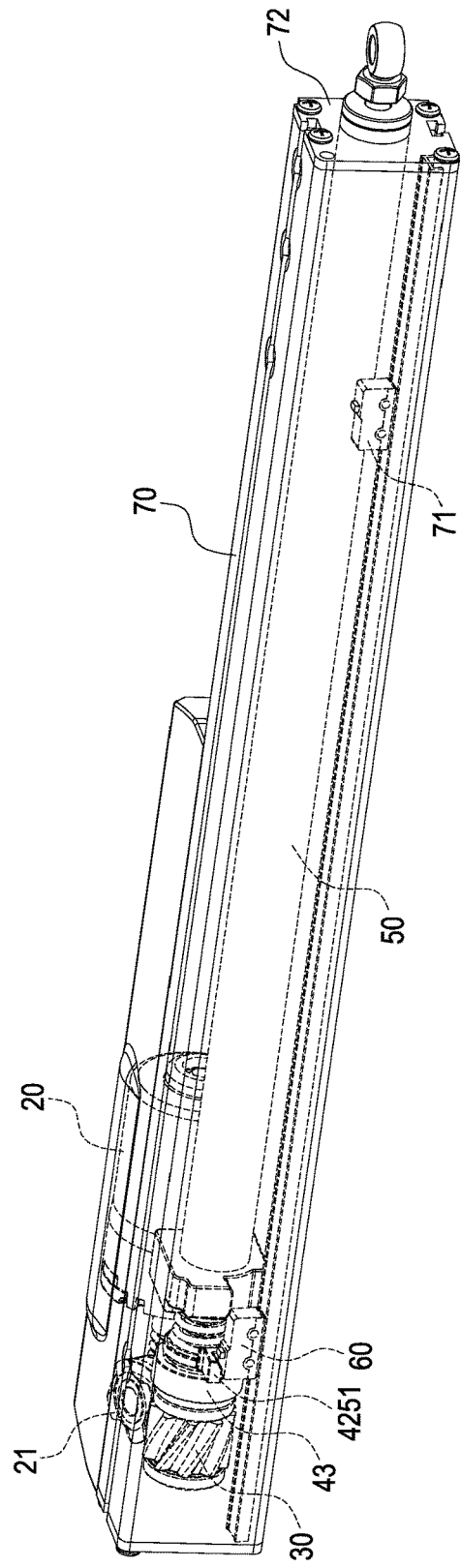
FIG. 1 is a schematic view of the actuator of the invention.
Figure 2:
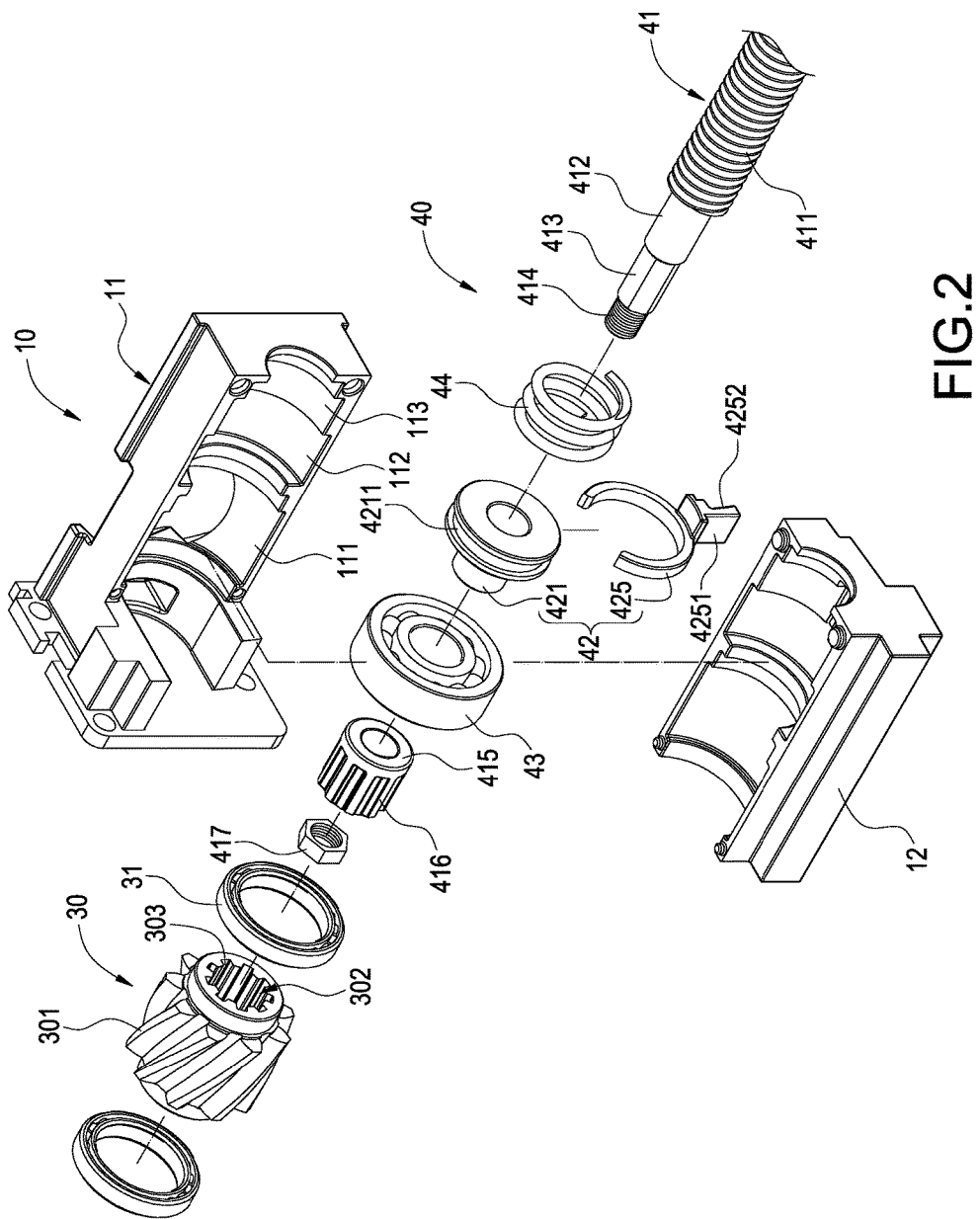
FIG. 2 is an exploded view of the driven gear and transmission of the invention.
Figure 3:
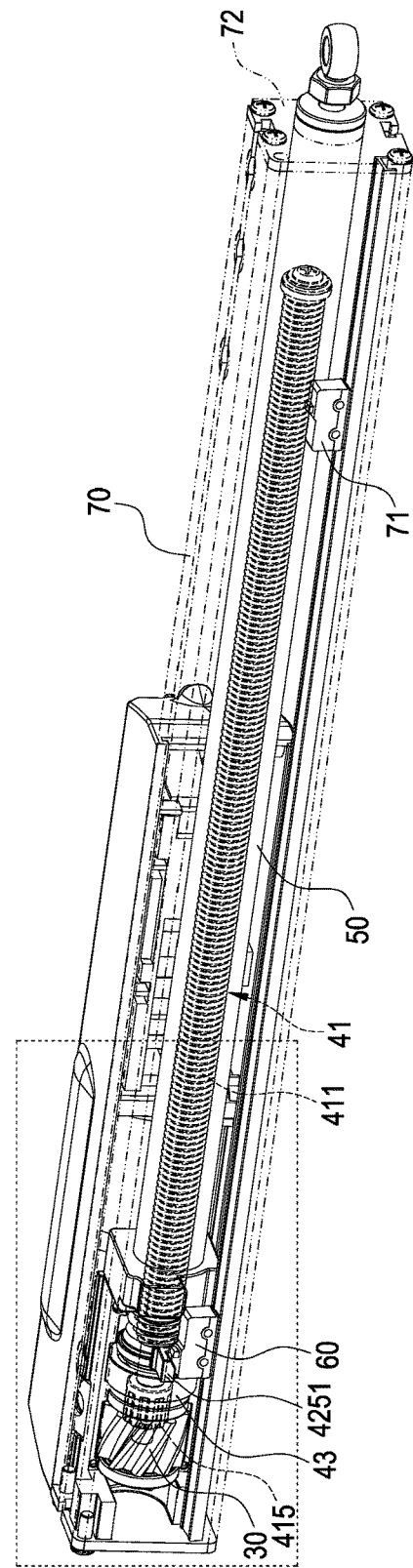
FIG. 3 is a perspective view of the actuator structure of the invention.
Figure 4:
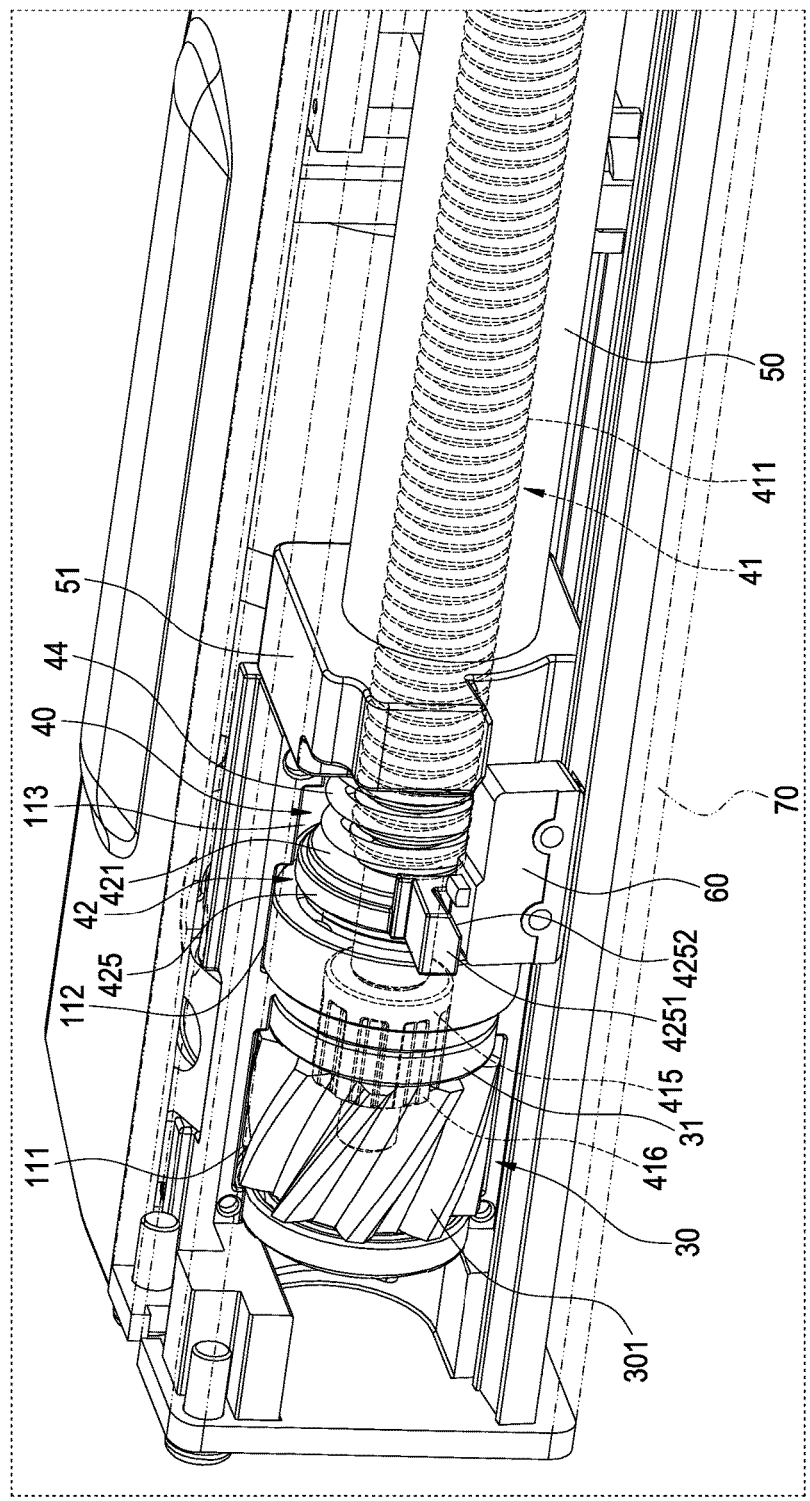
FIG. 4 is a partially enlarged view of FIG. 3.
Figure 5:
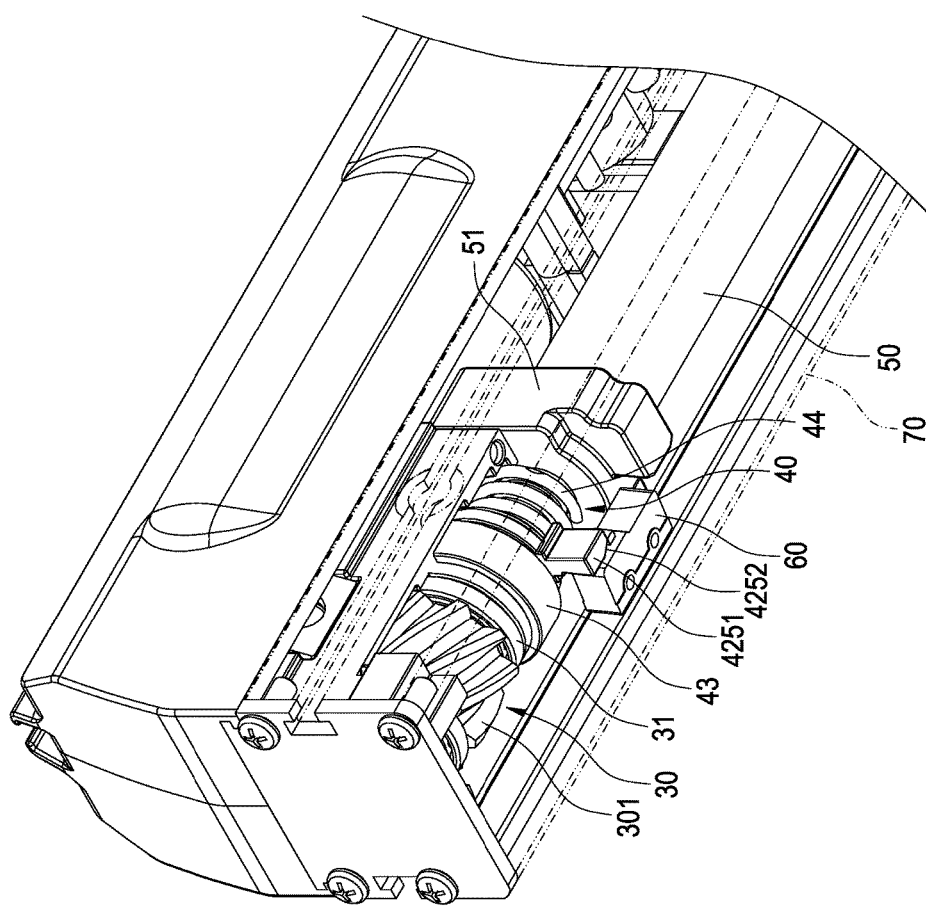
FIG. 5 is a partially enlarged view of the invention before the transmission moves.

Please refer to FIGS. 1 and 4. The invention is to provide an actuator with a safety mechanism, which includes a gear box 10, a motor 20, a driven gear 30, a transmission 40, a retractable tube 50 and a push switch 60.

The gear box 10 is a cuboidal body made of a metal and includes a lower case 11 and an upper case 12. A gear room 111, a bearing room 112 and a spring room 113 are formed in the lower case in sequence. The upper case 12 correspondingly covers the lower case 11. The inside of the upper case 12 is also formed with a structure corresponding to and the same as the gear room 111, the bearing room 112 and the spring room 113.

The motor 20 is arranged at a side of the lower case 11 of the gear box 10 and is fixed on the lower case 11 by fasteners such as screws. In the embodiment, the power of the motor 20 is transferred through a transmission gear 111 entering the gear room 111.

The driven gear 30 is received in the gear room 111 and connected to the front and the rear of the driven gear 30 though two supporting elements 31. Thus they all are conjointly supported in the gear box 10. The driven gear 30 has an outer gear 301 meshing with the transmission gear 21 so as to be able to be driven by the motor 20 to rotate. The center of the driven gear 30 is formed with a though hole 302. An inner wall of the through hole 302 is formed with inner embedding troughs 303.

A part of the transmission 40 is arranged in the gear box 10 and the other part of the transmission 40 projects over the gear box 10. The transmission 40 includes a guiding threaded rod 41 and a touch element 42. The guiding threaded rod 41 includes a thread section 411, a round shaft section 412 extending from the thread section 411, a limiting section 413 extending from the round shaft section 412 and a screw section 414 extending from the limiting section 413. The touch element 42 is connected around the round shaft section 412.

The guiding threaded rod 41 is movably connected to the driven gear 30 through a shaft connector 415. A shape of an inner hole of the shaft connector 415 corresponds to a periphery of the limiting section 413 to be a polygon for conjointly rotating. A plurality of ribs 416 engaging with the inner embedding troughs 303 are formed on a periphery of the shaft connector 415 so as to make the guiding threaded rod 41 move forward or rearward axially only along the through hole 302 of the driven gear 30. The shaft connector 415 is connected after the limiting section 413. The shaft connector 415 is connected to the guiding threaded rod 41 to be an integral by screwing a nut 417 onto the screw section 414.

Further, the transmission 40 includes a bearing 43 connected to the touch element 42 and supported in the bearing room 43 of the gear box 10. An axial length of the bearing room 112 is great than a width of the bearing 43 to allow the bearing 43 to make movably linear displacement in the bearing room 112.

Further, the transmission 40 includes an elastic element 44 around the guiding threaded rod 41 and in the spring room 113. Two ends of the elastic element 44 are pinched between an inner wall of the gear box 10 and an end of the touch element 42.

Further, the touch element 42 of the embodiment includes a shaft sleeve 421 and a connecting ring 425. The shaft sleeve 421 is put around the round shaft section 412 of the guiding threaded rod 41 and rotates with the guiding threaded rod 41. An end of the shaft sleeve 421 is formed with a groove 4211. The connecting ring 425 is of a C-shape and put around the groove 4211 to be positioned. The connecting ring 425 does not rotate with the shaft sleeve 421 and the guiding threaded rod 41. A pressing block 4251 is extended from a middle of the connecting ring 425. A bottom right position of the pressing block 4251 is formed with a slant 4252.

The retractable tube 50 is arranged at a side of the gear box 10. An end of the retractable tube 50 is firmly connected with a nut 51 by which the retractable tube 50 is connected to the guiding threaded rod 41 to rotate conjointly.

The push switch 60 is electrically connected to the motor 20 though a wire (not shown) and is arranged in a moving path of the touch element 42.

Additionally, the actuator with a safety mechanism of the invention further includes an outer tube 70, a limit switch 71 and a front cover 72. The outer tube 70 completely covers the gear box 10, retractable tube 50, push switch 60 and limit switch 71 and formed on a side of the motor 20. The limit switch 71 is located in a moving path of the nut 51. The front cover 72 covers the front of the outer tube 70. An end of the retractable tube 50 projects over the outer tube 70 through the front cover 72.

Figure 6:
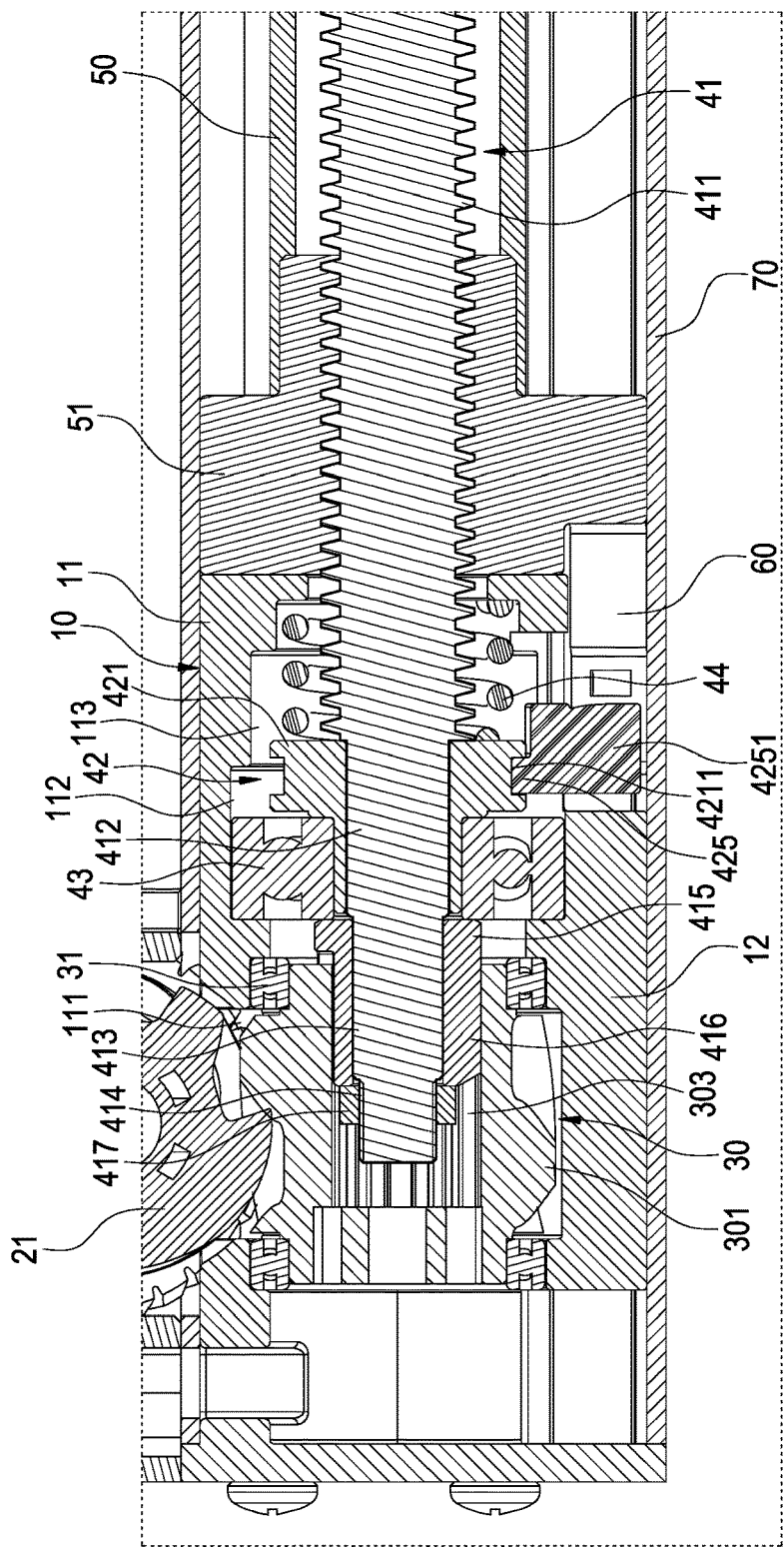
FIG. 6 is a cross-sectional view FIG. 5.
Figure 7:
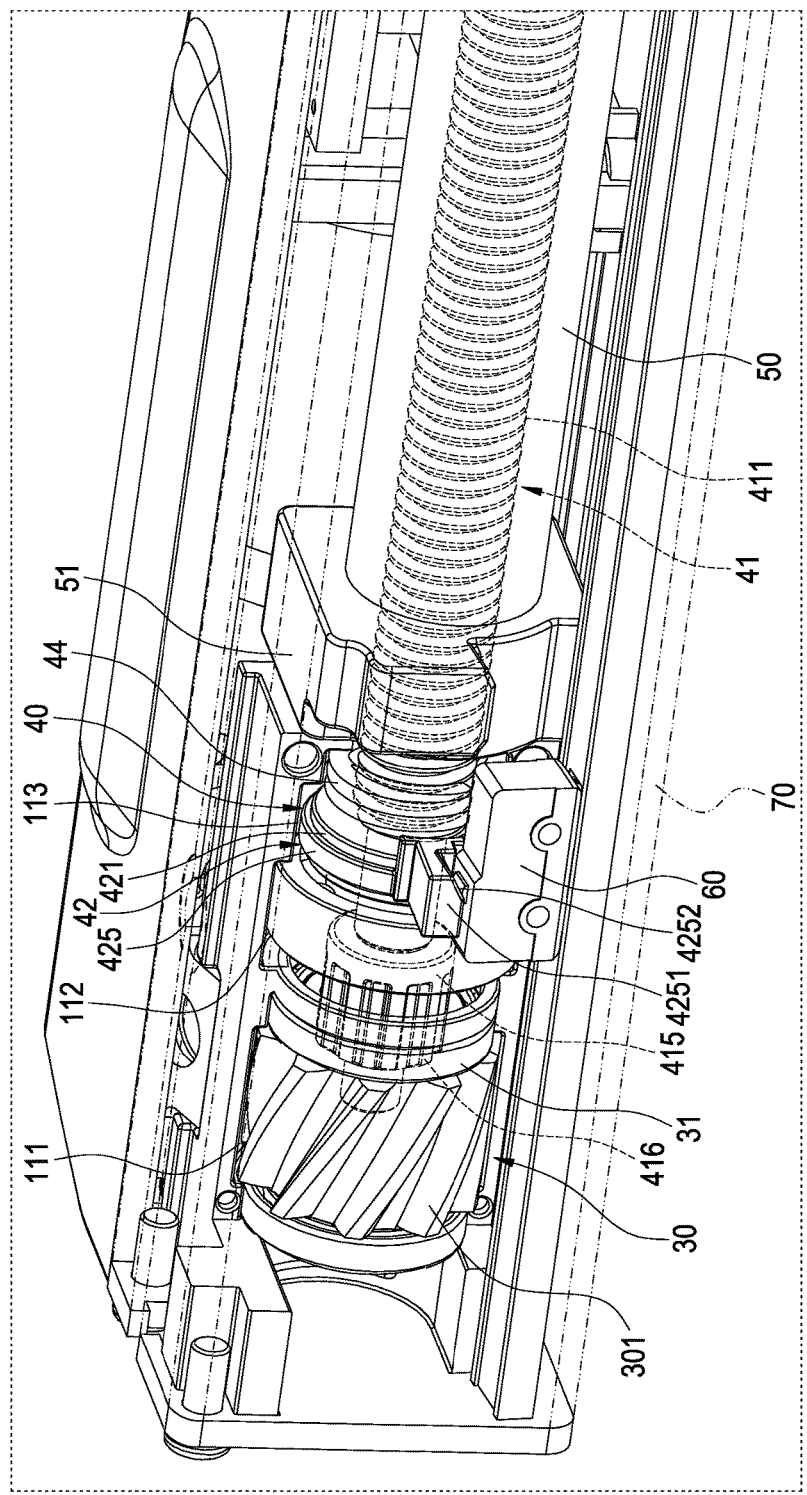
FIG. 7 is a partially enlarged view of the invention after the transmission moves.
Figure 8:
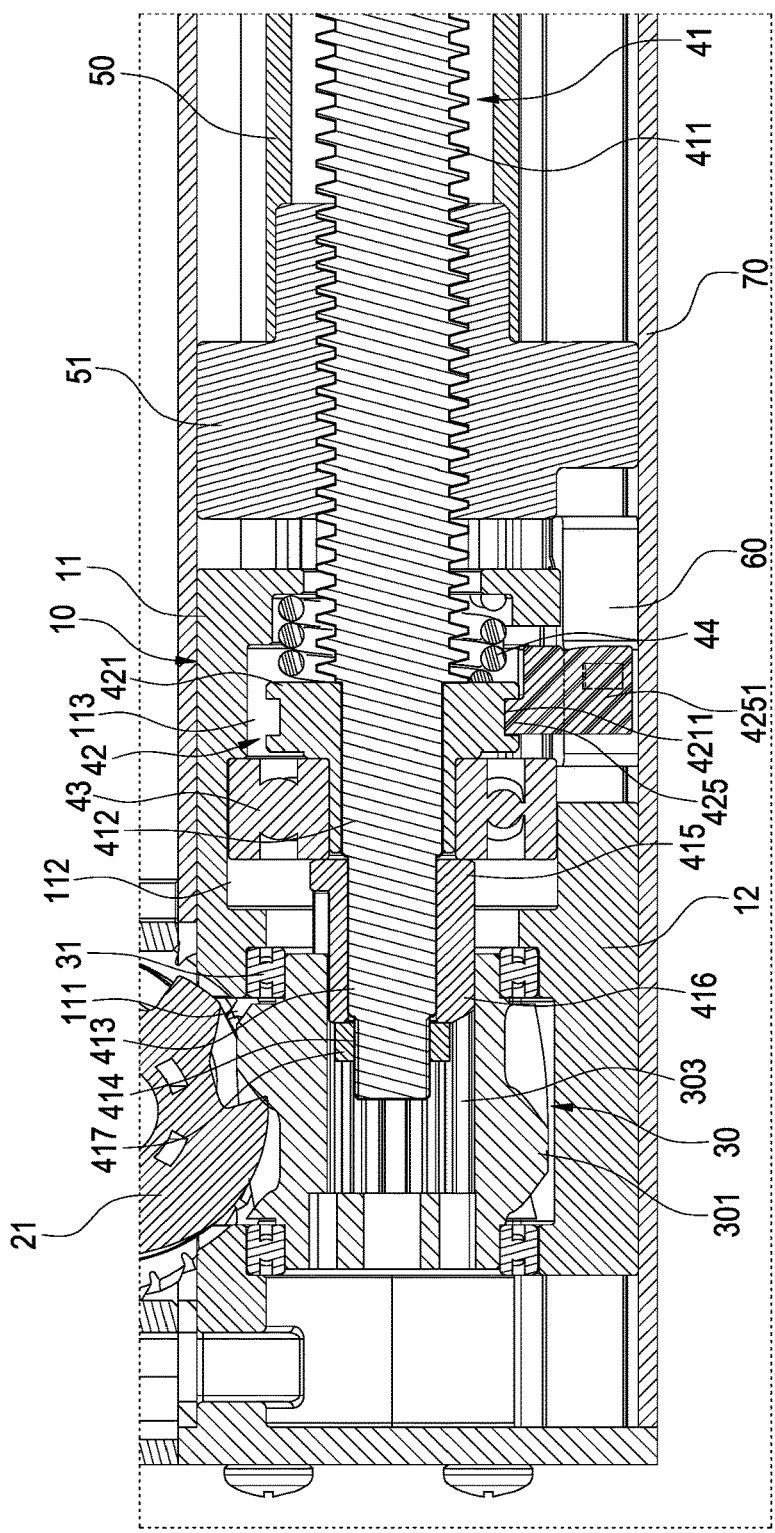
FIG. 8 is a cross-sectional view FIG. 7.

Please refer to FIGS. 5-8. When the motor 20 is started to operate, the driven gear 30 is driven through the transmission gear 21 and the guiding threaded rod 41 is driven through the shaft connector 415. The nut 51 of the retractable tube 50 is connected to the thread section 411 of the guiding threaded rod 41, so the retractable tube 50 retracts toward the gear box 10. When the retractable tube 50 is exerted with an external force (a resistant force) during moving or the nut 51 tightly abuts against an end of the gear box 10 during retracting, under the continuous rotation of the driven gear 30 and the cooperation of the inner embedding troughs 303 of the driven gear 30 and the ribs 416 of the shaft connector 415, the shaft connector 415 on the guiding threaded rod 41 axially moves toward a direction of leaving the driven gear 30. At this time, the guiding threaded rod 41, the touch element 42 and the bearing 43 linearly move toward the nut 51 of the retractable 50, i.e., the bearing 43 moves from the left of the bearing room 112 (as shown in FIG. 6) to the right of the bearing room 112 (as shown in FIG. 8). The motor 20 is stopped to rotate by the pressing block 4251 touching the push switch 60. In this embodiment, the slant 4252 of the pressing block can progressively press the push switch 60.

Figure 9:
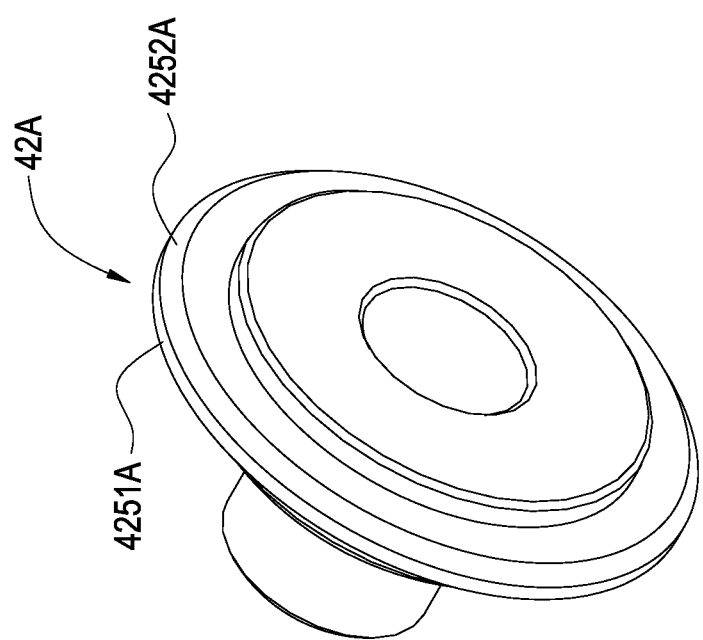
FIG. 9 is a perspective view of another embodiment of the touch element of the invention.

Please refer to FIG. 9. The embodiment uses a touch element 42A to replace the touch element 42 in the above embodiment. It is a single element having a touch flange 4251A. A slant 4252A is formed on an edge of the touch flange 4251A.

It will be appreciated by persons skilled in the art that the above embodiments have been described by way of example only and not in any limitative sense, and that various alterations and modifications are possible without departure from the scope of the invention as defined by the appended claims.

What is claimed is:

1. An actuator with a safety mechanism, comprising:
a gear box (10);
a motor (20) connected to the gear box (10);
a driven gear (30), received in the gear box (10) and driven by the motor (20);
a transmission (40), partly received in the gear box (10) and partly projecting over the gear box (10), having a guiding threaded rod (41) and a touch element (42) mounted around the guiding threaded rod (41), an end of the guiding threaded rod (41) penetratingly connecting the driven gear (30) and movably supported in the gear box (10) with the touch element (42);
a retractable tube (50), arranged at a side of the gear box (10), and threadedly connecting the guiding threaded rod (41) to be driven; and
a push switch (60), electrically connected to the motor (20), and arranged in a moving path of the touch element (42);
wherein when the retractable tube (50) stopped at any locations on the moving path, the transmission (40) will linearly move toward a direction of the retractable tube (50) and the motor (20) is stopped operating by touching the push switch (60) with the touch element (42).

2. The actuator with a safety mechanism of claim 1, wherein the guiding threaded rod (41) comprises a thread section (411) and a round shaft section (412) extending from the thread section (411), and the touch element (42) is connected around the round shaft section (412).

3. The actuator with a safety mechanism of claim 2, wherein the touch element (42) comprises a shaft sleeve (421) and a connecting ring (425), the shaft sleeve (421) is put around the round shaft section (412) and rotates with the guiding threaded rod (41), and the connecting ring (425) is connected around the shaft sleeve (421) but does not rotate with the shaft sleeve (421).

4. The actuator with a safety mechanism of claim 3, wherein an end of the shaft sleeve (421) is formed with a groove (4211), the connecting ring (425) is of a C-shape and put around the groove (4211).

5. The actuator with a safety mechanism of claim 4, wherein a pressing block (4251) is extended from the connecting ring (425), a bottom position of the pressing block (4251) is formed with a slant (4252) for touching the push switch (60).

6. The actuator with a safety mechanism of claim 2, wherein the guiding threaded rod (41) further comprises a limiting section (413) extending from the round shaft section (412) and a screw section (414) extending from the limiting section (413), the limiting section (413) is connected with a shaft connector (415), the shaft connector (415) is connected to the guiding threaded rod (41) to be an integral by screwing a nut (417) onto the screw section (414).

7. The actuator with a safety mechanism of claim 6, wherein the driven gear (30) is supported in the gear box (10) though two supporting elements (31), the driven gear (30) is formed with a though hole (302), an inner side of the through hole (302) is formed with inner embedding troughs (303), a plurality of ribs (416) engaging with the inner embedding troughs (303) are formed on a periphery of the shaft connector (415) so as to make the guiding threaded rod (41) move forward or rearward axially only along the through hole (302).

8. The actuator with a safety mechanism of claim 7, wherein the driven gear (30) has an outer gear (301) meshing with the transmission gear (21) so as to be driven by the motor (20) to rotate.

9. The actuator with a safety mechanism of claim 1, wherein the transmission (40) comprises a bearing (43), the gear box (10) comprises a lower case (11) and an upper case (12) covering the lower case (11), a bearing room (112) is formed in the lower case (11) and the upper case (12), and the bearing (43) is connected to the touch element (42) and supported in the bearing room (112).

10. The actuator with a safety mechanism of claim 9, wherein an axial length of the bearing room (112) is great than a width of the bearing (43) to allow the bearing (43) to make linear displacement in the bearing room (112).

11. The actuator with a safety mechanism of claim 9, wherein the transmission (40) comprises an elastic element (44), a spring room (113) is formed in the upper case (12) and the lower case (11), the elastic element (44) is put around the guiding threaded rod (41) and in the spring room (113), and two ends of the elastic element (44) are directly against one end of the gear box (10) and the touch element (42), respectively.

12. The actuator with a safety mechanism of claim 9, wherein a gear room (111) is formed in the upper case (12) and the lower case (11), and the driven gear (30) is supported in the gear room (111) through two supporting elements (31).

13. The actuator with a safety mechanism of claim 1, wherein the touch element (42) has a touch flange (4251A), a slant (4252A) is formed on an edge of the touch flange (4251A) for touching the push switch (60).

14. The actuator with a safety mechanism of claim 1, wherein an end of the retractable tube (50) is connected with a nut (51), and the retractable tube (50) is screwed to the guiding threaded rod (41) through the nut (51).

15. An actuator with a safety mechanism, comprising:
a gear box (10);
a motor (20) connected to the gear box (10);
a driven gear (30), received in the gear box (10) and driven by the motor (20);
a transmission (40), partly received in the gear box (10) and partly projecting over the gear box (10), having a guiding threaded rod (41) and a touch element (42) mounted around the guiding threaded rod (41), an end of the guiding threaded rod (41) penetratingly connecting the driven gear (30) and movably supported in the gear box (10) with the touch element (42);
a retractable tube (50), arranged at a side of the gear box (10), and threadedly connecting the guiding threaded rod (41) to be driven; and
a push switch (60), electrically connected to the motor (20), and arranged in a moving path of the touch element (42);
wherein when the retractable tube (50) is limited during moving, the transmission (40) will linearly move toward a direction of the retractable tube (50) and the motor (20) is stopped operating by touching the push switch (60) with the touch element (42);
wherein the guiding threaded rod (41) comprises a thread section (411) and a round shaft section (412) extending from the thread section (411), and the touch element (42) is connected around the round shaft section (412);
wherein the guiding threaded rod (41) further comprises a limiting section (413) extending from the round shaft section (412) and a screw section (414) extending from the limiting section (413), the limiting section (413) is connected with a shaft connector (415), the shaft connector (415) is connected to the guiding threaded rod (41) to be an integral by screwing a nut (417) onto the screw section (414).

* * * * *